(12) United States Patent
Wei

(10) Patent No.: US 11,137,566 B2
(45) Date of Patent: Oct. 5, 2021

(54) LENS MODULE

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 189 days.

(21) Appl. No.: 16/517,769

(22) Filed: Jul. 22, 2019

(65) Prior Publication Data

US 2020/0033547 A1 Jan. 30, 2020

(30) Foreign Application Priority Data

Jul. 24, 2018 (CN) .......................... 201821182060.X

(51) Int. Cl.
*G02B 9/00* (2006.01)
*G02B 7/02* (2021.01)
*G02B 7/00* (2021.01)
*G02B 13/00* (2006.01)

(52) U.S. Cl.
CPC ............. *G02B 7/021* (2013.01); *G02B 7/003* (2013.01); *G02B 7/022* (2013.01); *G02B 13/001* (2013.01)

(58) Field of Classification Search
CPC ........ G02B 7/021; G02B 7/022; G02B 7/003; G02B 13/001; G02B 7/026; H04N 5/2254
USPC ........................................................ 359/754
See application file for complete search history.

(56) References Cited

U.S. PATENT DOCUMENTS

2011/0109969 A1\* 5/2011 Ogasawara ............ G02B 7/021
359/601

\* cited by examiner

*Primary Examiner* — James C. Jones
(74) *Attorney, Agent, or Firm* — IPro, PLLC; Na Xu

(57) ABSTRACT

The present disclosure provides a lens module comprising a lens barrel, a lens received in the lens barrel, and a pressure ring configured for fixedly holding the lens in the lens barrel, wherein, the lens barrel comprises a primary barrel wall and a secondary barrel wall extending from a end of the primary barrel wall to an optical axis and forming a light through hole, wherein, the primary barrel wall comprises a first annular groove disposed on an inner wall adjacent to the lens, the lens fits with the first annular groove to form a pressure ring position, and the pressure ring is partly received in the pressure ring position. Compared with related art, the lens module provided by the present disclosure has higher reliability.

5 Claims, 3 Drawing Sheets

LENS MODULE

TECHNICAL FIELD

The present disclosure relates to the field of optical imaging, and more particularly to a lens module.

BACKGROUND

In recent years, with the continuous development of science and technology, electronic devices are constantly developed towards intelligentization. In addition to digital cameras, portable electronic devices such as tablet computers and mobile phones are also equipped with lens modules having camera functions so as to satisfy with users' needs of taking photos at any time.

A lens module of the related art comprises a lens barrel, a lens received in the lens barrel, and a pressure ring for holding the lens in the lens barrel, and the periphery of the pressure ring abuts against an inner wall of the lens barrel and is fixed to the lens barrel by dispensing.

However, in the related art, burrs may be generated on the outside surface of the pressure ring during the manufacturing process, and the lens barrel is not provided with a clearance structure therein for clearing the burrs of the pressure ring, such that the stability of the connection between the pressure ring and the lens barrels is affected.

Therefore, it is necessary to provide an improved lens module to solve the above problems.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. To those skilled in the art, other drawings can be obtained according to these drawings without any creative work, wherein.

DETAILED DESCRIPTION

The technical solutions in the embodiments of the present disclosure will be clearly and completely described in conjunction with the drawings in the embodiments of the present disclosure. It is obvious that the described embodiments are just a part but not all of the embodiments of the present disclosure. All other embodiments obtained by those skilled in the art based on the embodiments of the present disclosure without creative efforts would fall within the scope of the present disclosure.

Figure 1:
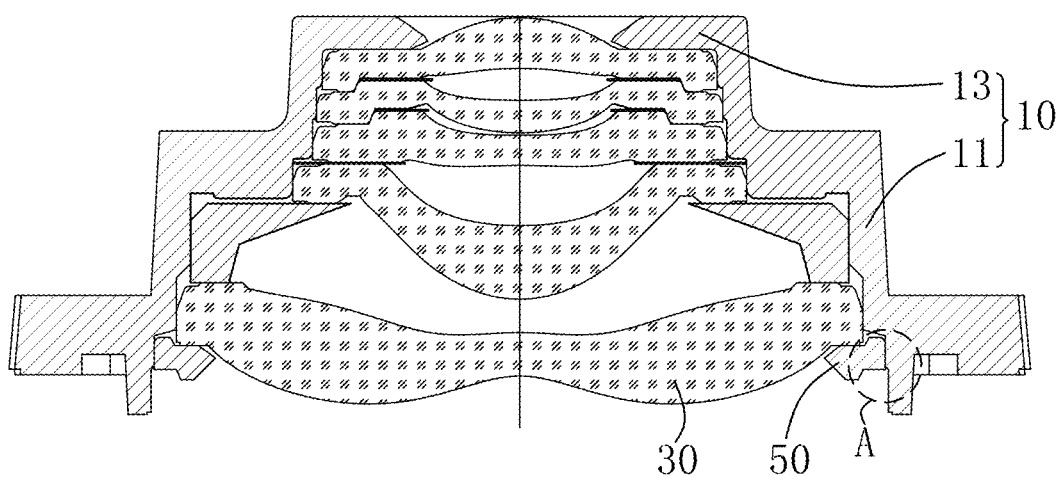
FIG. 1 is a structural diagram of a lens module of the present disclosure.
Figure 2:
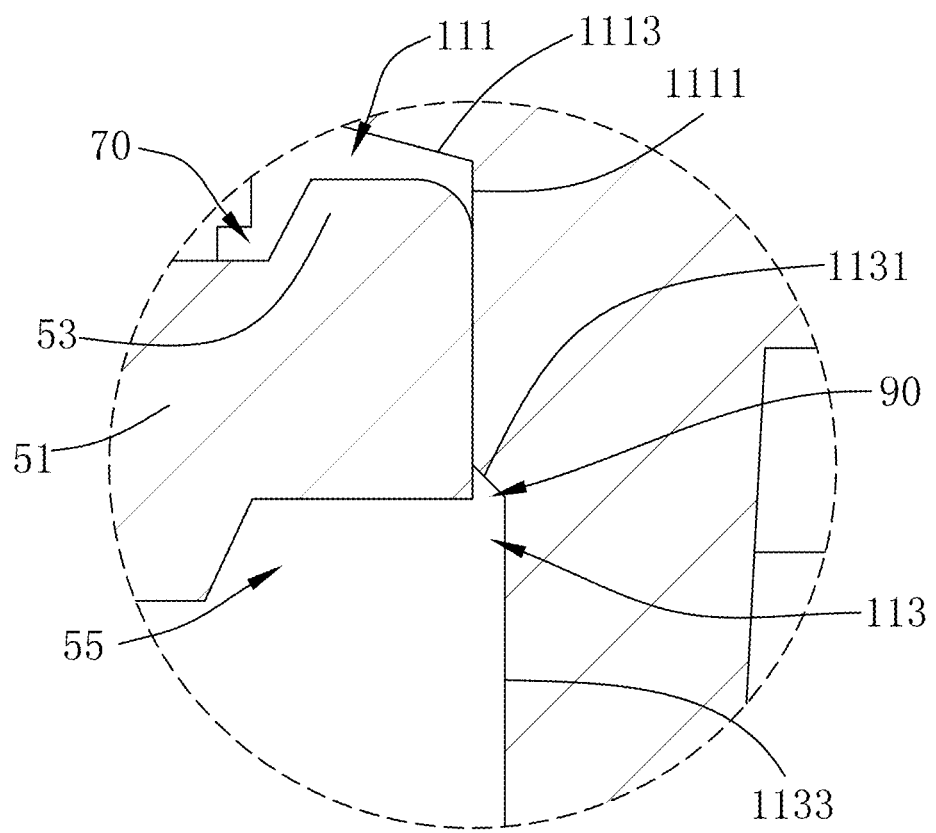
FIG. 2 is a partial enlarged view of area A shown in FIG. 1.
Figure 3:
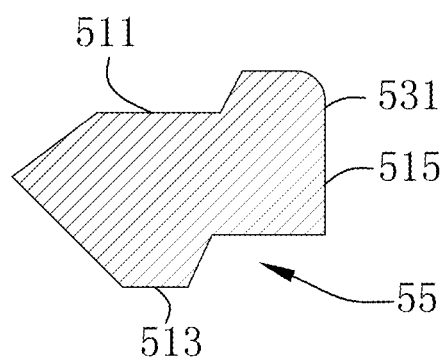
FIG. 3 is a structural cross-sectional diagram of the pressure ring shown in FIG. 1.

Referring to FIG. 1 to FIG. 3, the present disclosure provides a lens module 100 comprising a lens barrel 10, a lens 30 received in the lens barrel 10 and a pressure ring 50 for fixedly holding the lens 30 in the lens barrel 10.

The lens barrel 10 comprises a primary barrel wall 11 and a secondary barrel wall 13 extending from one end of the primary barrel wall 11 to an optical axis of the lens module and forming a light through hole.

The primary barrel wall 11 comprises a first annular groove 111 provided on an inner wall adjacent to the lens 30 and a second annular groove 113 provided on the inner wall adjacent to the pressure ring 50.

The outer diameter of the second annular groove 113 is larger than the outer diameter of the first annular groove 111.

The lens 30 fits with the first annular groove 111 so as to form a pressure ring position 70.

The pressure ring 50 is partly received in the pressure ring position 70 to press the lens 30 against the lens barrel 10.

The second annular groove 113 fits with the pressure ring 50 so as to form a notch 90 for clearing the burrs.

The first annular groove 111 comprises a first surface 1111 perpendicular to the sub-barrel wall 13 and a second surface 1113 extending to the optical axis from an end of the first surface 1111 adjacent to an object side.

The second annular groove 113 comprises a slope 1131 extending obliquely from an end of the first surface 1111 adjacent to the image side in a direction away from the optical axis, and a third surface 1133 extending from a terminal of the slope 1131 in a direction away from the secondary barrel wall 13.

The pressure ring 50 comprises a pressure ring main body portion 51, a pressure ring extending portion 53 formed by extending from a periphery of an object side surface of the pressure ring main body portion 51 in a direction away from an image side surface, and a dispensing groove 55 formed by recessing from a periphery of the image side surface of the pressure ring main body portion 51 to the object side surface thereof.

The pressure ring main body portion 51 comprises a top surface 511 adjacent to the object side, a bottom surface 513 adjacent to the image side, and a first connecting surface 515 connecting the top surface 511 and a side of the bottom surface 513 away from the optical axis.

The top surface 511 abuts against the image side surface of the lens 30 such that the pressure ring 50 fixedly holds the lens 30 to the lens barrel 10.

A portion of the first connecting surface 515 abuts against the first surface 1111, and the other portion extends to the image side out of the first surface 1111.

An angle between the slope 1131 and a portion of the first connecting surface 515 extending out of the first surface 1111 is an acute angle.

It will be understood that the portion of the first connecting surface 515 extending out of the first surface 1111, the slope 1131 and the third surface 1133 jointly form the notch 90.

The pressure ring extending portion 53 is received in the pressure ring position 70.

The pressure ring extending portion 53 comprises a second connecting surface 531 extending from the first connecting surface 515 to the second surface 1113.

The second connecting surface 531 abuts against the first surface 1111.

Since the provision of the pressure ring extension portion 53 increases the edge thickness of the pressure ring 50, thereby increasing the fitting length of the pressure ring 50 with the lens barrel 10, increasing the abutment area of the pressure ring 50 with the first surface 1111, and thus enhancing the stability of fitting; on the other hand, the first connecting surface 515 partly extends out of the first surface 1111, such that a space is formed between the portion of the first connecting surface 515 extending out of the first surface 1111 and the primary barrel wall 11, that is, the notch 90 is formed, therefore, a gap is formed between the portion of the first connecting surface 515 and the primary barrel wall 11 for clearing the burrs of the pressure ring 50 generated during processing, and a clearance structure for clearing the burrs of the pressure ring 50 is formed, improving the reliability of the lens module 100.

The dispensing groove 55 is in communication with the primary barrel wall 11.

Specifically, the dispensing groove 55 is in communication with the second annular groove 113.

The pressure ring 50 is effectively bonded to the lens barrel 10 by dispensing at the dispensing groove 55, thereby providing a good fixing to the pressure ring 50.

In this embodiment, the pressure ring 50 and the lens barrel 10 are fixedly connected by glue. Of course, in other embodiments, the pressure ring 50 can be coupled and fixed to the lens barrel 10 by a hot pressing process.

It will be understood that the slope 1131 could make the pressure ring 50 more easily reach the predetermined position during installation, and could also increase the space between the first connecting surface 515 and the primary barrel wall 11, which is more beneficial for clearing the burrs generated after the processing of the pressure ring 50, meanwhile, the dispensing space of the dispensing groove 55 is increased, and the pressure ring 50 and the lens barrel 10 could be better connected and fixed through the dispensing groove 55.

Compared with the prior art, in the lens module of the present disclosure, the first annular groove is provided such that the lens is fitted with the first annular groove to form the pressure ring position, and the pressure ring is partly received in the pressure ring position; the edge thickness of the pressure ring is increased due to the provision of the pressure ring extending portion, thereby increasing the fitting length of the pressure ring with the lens barrel, increasing the abutment area of the pressure ring with the primary barrel wall, and thus enhancing the stability of fitting; on the other hand, the second annular groove is provided on the inner wall adjacent to the pressure ring, and the second annular groove and the pressure ring form a notch for clearing the burrs, thereby ensuring that the pressure ring is stably connected to the lens barrel while a clearance structure for clearing the burrs is formed, thus improving the reliability of the lens module.

The above is only embodiments of the present disclosure, and it should be noted that those skilled in the art can make improvements without departing from the concept of the present disclosure, but these improvements all fall in the protection range of the present disclosure.

What is claimed is:

1. A lens module comprising a lens barrel, a lens received in the lens barrel, and a pressure ring configured for fixedly holding the lens in the lens barrel, wherein, the lens barrel comprises a primary barrel wall, and a secondary barrel wall extending from an end of the primary barrel wall to an optical axis of the lens module and forming a light through hole, wherein, the primary barrel wall comprises a first annular groove disposed on an inner wall adjacent to the lens, the lens fits with the first annular groove to form a pressure ring position, and the pressure ring is partly received in the pressure ring position;

the pressure ring comprises a pressure ring body portion and a pressure ring extending portion formed by extending from a periphery of an object side surface of the pressure ring body portion in a direction away from an image side of the lens module, and the pressure ring extending portion is received in the pressure ring position;

the first annular groove comprises a first surface perpendicular to the secondary barrel wall and a second surface extending from an end of the first surface adjacent to an object side to the optical axis, and the pressure ring extending portion abuts against the first surface;

the primary barrel wall further comprises a second annular groove disposed on an inner wall adjacent to the pressure ring, the second annular groove fits with the pressure ring to form a notch for clearing the burrs.

2. The lens module according to claim 1, wherein the pressure ring body portion comprises a top surface adjacent to the object side, a bottom surface adjacent to the image side, and a first connecting surface configured for connecting the top surface and a side of the bottom surface away from the optical axis, the pressing ring extending portion comprises a second connecting surface extending from the first connecting surface to the second surface, the first connecting surface and the second connecting surface both abut against the first surface.

3. The lens module according to claim 2, wherein the top surface abuts against the lens.

4. The lens module according to claim 3, wherein the pressure ring further comprises a dispensing groove formed by recessing from a periphery of an image side surface of the pressure ring body portion to the object side surface, the dispensing groove is in communication with the second annular groove.

5. The lens module according to claim 4, wherein the second annular groove comprises a slope extending obliquely from the first surface in a direction away from the optical axis and a third surface extending from a terminal of the slope in a direction away from the secondary barrel wall, and an angle between the slope and the first connecting surface is an acute angle.

* * * * *